(12) United States Patent
Skinner et al.

(10) Patent No.: US 8,963,370 B2
(45) Date of Patent: Feb. 24, 2015

(54) LOAD SHARING APPARATUS

(75) Inventors: Andrew John Skinner, Woolacombe (GB); Martin Coates, Ilfracombe (GB)

(73) Assignee: TDK-Lambda UK Limited, Devon (GB)

( * ) Notice: Subject to any disclaimer, the term of this patent is extended or adjusted under 35 U.S.C. 154(b) by 776 days.

(21) Appl. No.: 13/218,061

(22) Filed: Aug. 25, 2011

(65) Prior Publication Data

US 2012/0056479 A1    Mar. 8, 2012

(30) Foreign Application Priority Data

Sep. 3, 2010   (GB) .................................. 1014650.4

(51) Int. Cl.
  *H02J 1/14*   (2006.01)
  *H02J 1/10*   (2006.01)
(52) U.S. Cl.
  CPC ..... *H02J 1/10* (2013.01); *H02J 1/14* (2013.01)
  USPC .................... 307/57; 307/43; 307/52; 307/53
(58) Field of Classification Search
  CPC ........................................................ H02J 1/14
  USPC .......................................... 307/43, 52–53, 57
  See application file for complete search history.

(56) References Cited

U.S. PATENT DOCUMENTS

| | | | |
|---|---|---|---|
| 4,924,170 A * | 5/1990 | Henze | 323/272 |
| 5,200,643 A | 4/1993 | Brown | |
| 5,576,940 A | 11/1996 | Steigerwald et al. | |
| 6,381,155 B1 * | 4/2002 | Kadatsky et al. | 363/65 |
| 7,541,793 B2 | 6/2009 | Saeueng et al. | |
| 2009/0021885 A1 | 1/2009 | Poh | |
| 2010/0013307 A1 * | 1/2010 | Heineman et al. | 307/33 |

FOREIGN PATENT DOCUMENTS

| | | |
|---|---|---|
| JP | 09-172772 | 6/1997 |
| JP | 9-172772 | 6/1997 |

OTHER PUBLICATIONS

Search Report dated Aug. 22, 2011 issued by GB Intellectual Property Office in GB Pat. App. No. GB1014650.4.
U.K. Patent Application No. GB1014650.4, Examination Report under Section 18(3) dated Jul. 27, 2012.

* cited by examiner

*Primary Examiner* — Adi Amrany
(74) *Attorney, Agent, or Firm* — Nixon Peabody LLP; Jeffrey L. Costellia (57) ABSTRACT

Load sharing apparatus for load sharing between a plurality of power supplies (1, 2). The apparatus comprises one or more load sharing modules (Share1, Share2), each for association with a respective power supply. The or each load sharing module comprises load determining means for generating a signal which represents a load value corresponding to the power or current supplied by the respective power supply, and voltage control means for controlling the output voltage of the respective power supply to vary inversely with said load value at a first rate when the load value is below a threshold value, and for controlling the output voltage of the respective power supply to vary inversely with said load value at a second rate when the load value equals or exceeds said (first) threshold value. Said second rate is greater than said first rate.

17 Claims, 10 Drawing Sheets

LOAD SHARING APPARATUS

BACKGROUND OF THE INVENTION

The present invention relates to load sharing apparatus for load sharing between a plurality of power supplies.

In systems which are required to operate with high reliability, it is often necessary to operate multiple power supplies in parallel, such that if one power supply should fail, a sufficient number of power supplies remain in operation for the system to continue to operate. This is known as "n+1 redundancy".

For example, 4 power supplies rated at 300 W would be required to supply a 900 W load in a 3+1 redundant system, assuming that the power supplies share the load equally.

In practice, however, power sharing accuracies of +/−10% of full load are not uncommon, due to variations in output voltage setting accuracy and load regulation characteristics between power supplies.

Thus, in the above example, at least one additional power supply is required, to ensure that no one power supply is caused to operate above its 300 W rating.

There are two established techniques used for improving the sharing accuracy between parallel connected power supplies.

One method is to use a share bus. A share bus is an analogue or digital interface between the parallel connected power supplies, which forces the power supplies to output the same current. However, this solution is not appropriate for high reliability applications because failure of the share bus can cause the whole system to fail.

The second method is to use a technique known as droop sharing. In this technique, the load regulation of a power supply, i.e. the variation of output voltage with current, is deliberately made higher. This forces the output voltage to reduce as the power supply is loaded.

Where power supplies are parallel connected, the power supply with the highest output voltage will deliver current to the load. However, if droop sharing is applied, the output voltage of that power supply will reduce as it is loaded, thereby forcing the other supplies to deliver some current as well. The amount of droop, over the load range (i.e. the total reduction in voltage over the load range), needs to exceed the variation in output voltage setting accuracy if all supplies are to deliver some current to the load. However, if good sharing accuracy is required, the amount of droop must be substantially higher.

A known technique which allows good sharing accuracy at full load, is to apply droop only when the output current or power of each power supply exceeds a threshold load value close to 100% of full load, by applying a large dynamic impedance. In this way, the output voltage of the respective power supply falls significantly for only a small change in current above this threshold. This ensures that load sharing takes place before any one power supply exceeds is load rating.

However, this technique does not allow for load sharing at lighter loads, with the result that only one or some of the power supplies deliver power to the load during normal operation. This results in a temperature difference between the power supplies and increases the spread in their mean time to failure (MTTF).

Moreover, the above technique does not allow peak current to be drawn from the power supply, because the output voltage will become low above 100% load.

SUMMARY OF THE INVENTION

According to one aspect of the present invention, there is provided load sharing apparatus for load sharing between a plurality of power supplies, the apparatus comprising one or more load sharing modules, each for association with a respective power supply, the or each load sharing module comprising:

load determining means for generating a signal which represents a load value corresponding to the power or current supplied by the respective power supply; and voltage control means for controlling the output voltage of the respective power supply to vary inversely with said load value at a first rate when the load value is below a (first) threshold value, and for controlling the output voltage of the respective power supply to vary inversely with said load value at a second rate when the load value equals or exceeds said (first) threshold value;

wherein said second rate is greater than said first rate.

Thus, with the present invention, droop can be applied over the full load range of each power supply, but with a two-stage profile, which is less steep at lighter loads than at heavier loads.

As a result, high sharing accuracy can be achieved at high loads, whilst still allowing for some load sharing at lighter loads.

By improving the sharing accuracy at high loads, the number of power supplies needed to achieve n+1 redundancy is reduced, which in turn reduces both the overall cost and size of the power supply system.

By also allowing for load sharing at lighter loads, a reduced spread in MTTF of the power supplies is achieved.

The (first) threshold load value is preferably between 95% and 100% of the maximum load rating of the power supply.

In a preferred embodiment, the voltage control means is configured for controlling the output voltage of the respective power supply to vary inversely with said load value at a third rate, which is lower than the second rate, when the load value equals or exceeds a second threshold value which is higher than the first threshold value.

More specifically, the load sharing means may comprise limiting means for limiting the total voltage reduction at said second rate, such that the output voltage of the respective power supply varies at the second rate between the first threshold value and a second threshold value.

Thus, droop is applied with a three-stage profile, which has regions corresponding to light load, heavy load and overload. The profile is steepest in the heavy load region, and less steep in the light load and overload regions.

This allows peak loading to be applied for limited duration.

The third rate is preferably substantially equal to the first rate. Alternatively, it may be higher than the first rate, or it may be lower than the first rate.

The second threshold load value is preferably between 100% and 105% of the maximum load rating of the power supply.

Preferably, the first threshold load value is below 100% of the maximum load rating of the power supply. In this case, the second threshold load value is preferably at least 95% of the maximum load rating of the power supply.

Preferably, the second threshold load value is above 100% of the maximum load rating of the power supply. In this case, the second threshold load value is preferably at least 95% of the maximum load rating of the power supply.

According to a further aspect of the present invention, there is provided load sharing apparatus for load sharing between a plurality of power supplies, the apparatus comprising one or more load sharing modules, each for association with a respective power supply, the or each load sharing module comprising:

a load determining module for generating a signal which represents a load value corresponding to the power or current supplied by the respective power supply;

a mode selecting module for selecting a first mode of operation when said load value is below a (first) threshold value and a second mode of operation when said load value equals or exceeds said (first) threshold value; and a voltage control module for controlling the output voltage of the respective power supply to vary inversely with said load value at a first rate when the first mode is selected, and for controlling the output voltage of the respective power supply to vary inversely with said load value at a second rate when the second mode is selected;

wherein said second rate is greater than said first rate.

The mode selecting module is preferably further configured for selecting a third mode of operation when said load value equals or exceeds a second threshold value which is higher than the first threshold value, in which case the voltage control means is preferably configured for controlling the output voltage of the respective power supply to vary inversely with said load value at a third rate, lower than the second rate, when the third mode is selected.

The load sharing module may comprise a limiting module for limiting the total voltage reduction at said second rate, such that the output voltage of the respective power supply varies at the second rate between the first threshold value and a second threshold value.

The third rate preferably equals the first rate, but may alternatively be lower or higher than the first rate.

The load sharing apparatus may further comprise a load limiting means for monitoring the load value, and reducing the output voltage of the respective power supply when the load exceeds a (third) threshold value for a predetermined duration.

The third threshold value is preferably between 120% and 140% of the maximum load rating of the power supply.

This prevents any one power supply operating in overload for too long.

The or each load sharing module may be implemented as an analogue circuit. In this case, the load determining module, voltage control means/module, and/or mode selecting modules may comprise a combination of suitably connected electronic components.

Alternatively, the or each load sharing module may be implemented on a suitably programmed micro-processor. Where there are a plurality of load sharing modules, these are preferably implemented on separate microprocessors.

In the following, the term "droop" refers to the rate at which voltage decreases with increasing load, and is thus equivalent to load regulation, i.e. the rate of change of voltage with load.

SUMMARY OF THE DRAWINGS

An embodiment of the present invention will now be described with reference to the accompanying drawings in which.

DETAILED DESCRIPTION OF THE INVENTION

Figure 1:
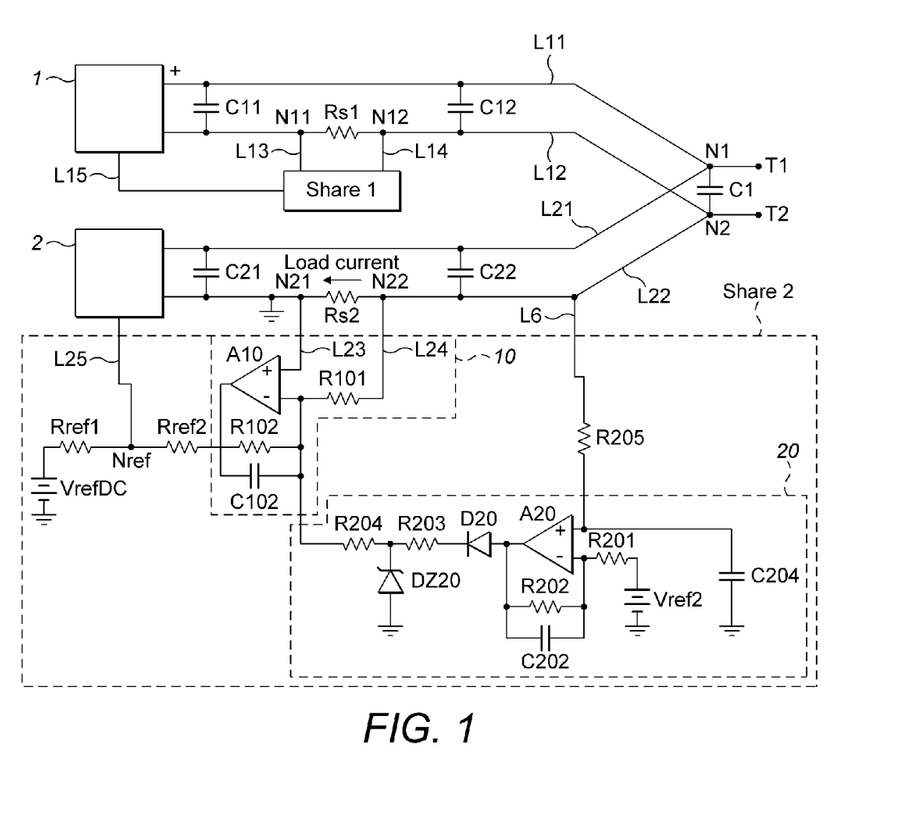
FIG. 1 shows a power supply system which incorporates an analogue load sharing module in accordance with a first embodiment of the present invention.

FIG. 1 shows a power supply system which incorporates an analogue circuit in accordance with a first embodiment of the present invention.

Two DC:DC power supplies 1, 2 are connected in parallel to nodes N1, N2, via lines L11, L12 and lines L21, L22 respectively. Nodes N1, N2 are respectively connected to output terminals T1, T2, for connection to a load (not shown). A capacitor C1 is connected between nodes N1, N2.

With reference to the first power supply 1, two capacitors C11, C12 are connected in parallel between lines L11, L12. Two lines L13, L14 branch from line L12 at nodes N11, N12 respectively. A shunt resistor Rs1 is connected along line L12 between nodes N11, N12. Lines L13, L14 carry input to a load sharing block Share1, which is described in more detail below. Output from Share1 is carried on line L15 to an input terminal of the first power supply 1.

A similar arrangement applies to the second power supply 2. That is to say, two capacitors C21, C22 are connected in parallel between lines L21, L22. Two lines L23, L24 branch from line L22 at nodes N21, N22 respectively. A resistor Rs2 is connected on line L22 between nodes N21, N22. Lines L23, L24 carry input to a load sharing block Share2, which is described in more detail below. Output from Share2 is carried on line L25 to an input terminal of the second power supply 2.

For the purposes of illustration, only the second load sharing block Share2 is shown in detail in FIG. 1. However, the first load sharing module Share1 comprises corresponding components and circuitry. Thus, the following description applies to both load sharing modules.

Each load sharing module comprises two circuit blocks 10, 20.

Block 10 comprises a first operational amplifier A10, which is configured as an inverting amplifier. Line L23 (L13) is connected to the non-inverting input of amplifier A10. Line L24 (L14) is connected to resistor R101, which is turn connected to the inverting input of amplifier A10. The output of amplifier A10 is connected to parallel connected resistor R102 and capacitor C102, which are in turn connected to the inverting input of amplifier A10.

The output of amplifier A10 is further connected to series connected resistors Rref2, Rref1, which are in turn connected to first voltage reference VrefDC, which is connected to ground. Line L25 (L15), which carries input from the load sharing module to the power supply, branches from a node Nref between resistors Rref1 and Rref2.

Block 20 comprises a second operational amplifier A20. Line L6 branches from line L22 (L21) between capacitor C22 (C21) and node N2. Line L6 is connected to resistor R205 which is in turn connected to the non-inverting input of amplifier A20. The non-inverting input of amplifier A20 is further connected to a capacitor C204, which is in turn connected to ground. The inverting input of amplifier A20 is connected to resistor R201, which is in turn connected to second voltage reference Vref2 is in turn connected to ground. The output of amplifier A20 is connected to parallel connected resistor R202 and capacitor C202, which are in turn connected to the inverting input of amplifier A20.

The output of amplifier A20 is further connected to the anode of a diode D20, which is in turn connected to series connected resistors R203, R204. Resistor R204 is further connected to the inverting input terminal of the first amplifier A10 in block 10. The cathode of a Zenor Diode DZ20 is connected at to a node N20 located between series connected resistors R203, R204. The anode of Zenor diode DZ20 is connected to ground.

In use, power supplies 1, 2 supply power to a load (not shown) connected to output terminals T1, T2. The load sharing modules Share1, Share2 ensure that power/current is drawn from both power supplies by varying the reference voltage applied to the respective power supply according to its output load.

The reference voltage applied to the power supply by the respective load sharing module is set by VrefDC, divided down by resistors Rref1, Rref2, and is thus dependent on the output voltage of amplifier A10.

Figure 2:
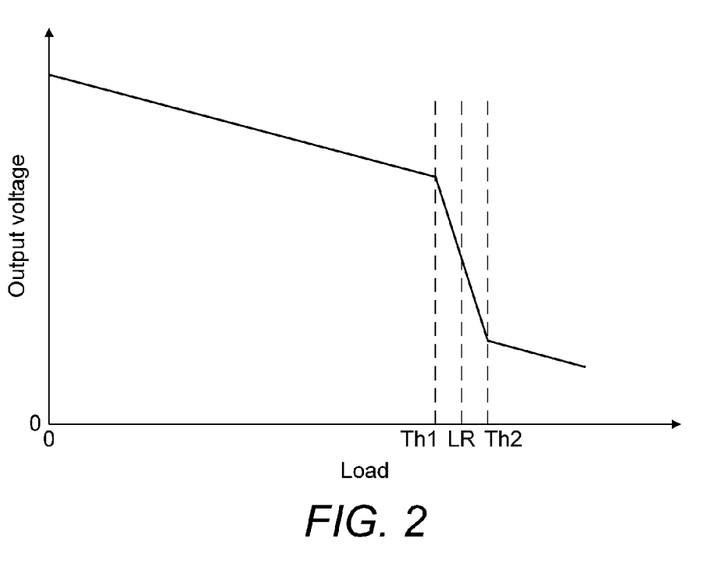
FIG. 2 illustrates the relationship between output voltage and output load for one of the power supplies in FIG. 1, 5 or 6.

FIG. 2 illustrates the relationship between output voltage and output load (i.e. current or power) for one of the power supplies 1, 2.

When the output load of the power supply is zero, amplifier A10 has an output voltage of zero.

Above zero load, amplifier A10 has a negative output voltage whose magnitude is proportional to the load value. Below a first threshold value Th1, just below the load rating LR of the power supply, the variation of output voltage of amplifier A10 is defined by the voltage across the shunt resistor Rs2 (Rs1) and its own gain, which is determined by resistors R101, R102. Capacitor C102 and associated resistor R102 provide low pass filtering.

Accordingly, in a first region of the graph in FIG. 2, which corresponds to a range of load value from 0-Th1, the reference voltage applied to the power supply, and thus the output voltage of the power supply, decreases with increasing load at a substantially constant first rate.

When the voltage across the shunt resistor Rs1, Rs2 exceeds a second reference voltage set by Vref2, the output voltage of the second amplifier A20 varies proportionally with load. This provides a varying input voltage to the inverting input of the first amplifier A10 via resistors R203, R204, which increases the rate at which the output voltage of A10 varies with increasing load. The range over which this increased rate is applied is limited by diode DZ20, which prevents the amplifier A20 having an effect on the output voltage of amplifier A10 above a second threshold load value Th2, just above the load rating of the power supply. Capacitor C202 and associated resistor R202 provide low pass filtering.

Accordingly, in a second region of the graph in FIG. 2, which corresponds to a range of load value from Th1-Th2, the reference voltage applied to the power supply, and thus the output voltage of the power supply, decreases with increasing load at a substantially constant second rate, which is greater than the first rate.

However, in a third region of the graph, which corresponds to load values above Th2, the reference voltage applied to the power supply, and thus the output voltage of the power supply, again decreases with increasing load at the substantially constant first rate.

With the above described three-stage profile, load regulation (or droop) is applied over the whole load range. Below Th1, load regulation is applied at a first, lower, rate, which is sufficient to ensure some load sharing between the power supplies. This reduces the spread of MTTF between the devices. Above Th1, load regulation is applied at a second, higher rate, to achieve more accurate load sharing when the power supplies are operating at or around their maximum load rating. This reduces the number of power supplies required to achieve n+1 redundancy. Above Th2, load regulation is again applied at the first, lower rate. This makes it possible for the power supplies to operate above their maximum power rating, which is desirable in systems which operate at lower power for most of the time, but require the ability to draw higher power over short time periods.

It will be appreciated that limiter DZ20 can be omitted, in which case there will be a two-stage profile, in which load regulation is applied at a lower rate in the range 0-Th1 and at a higher rate at or above Th1.

FIG. 1 shows two power supplies 1, 2 connected to output terminals T1, T2. However, it will be appreciated that one or more additional power supplies can be connected to the same output terminals in a similar manner. In this case, each additional power supply may have an associated load sharing module similar to Share1, Share2 to ensure load sharing between all the power supplies.

Figure 3:
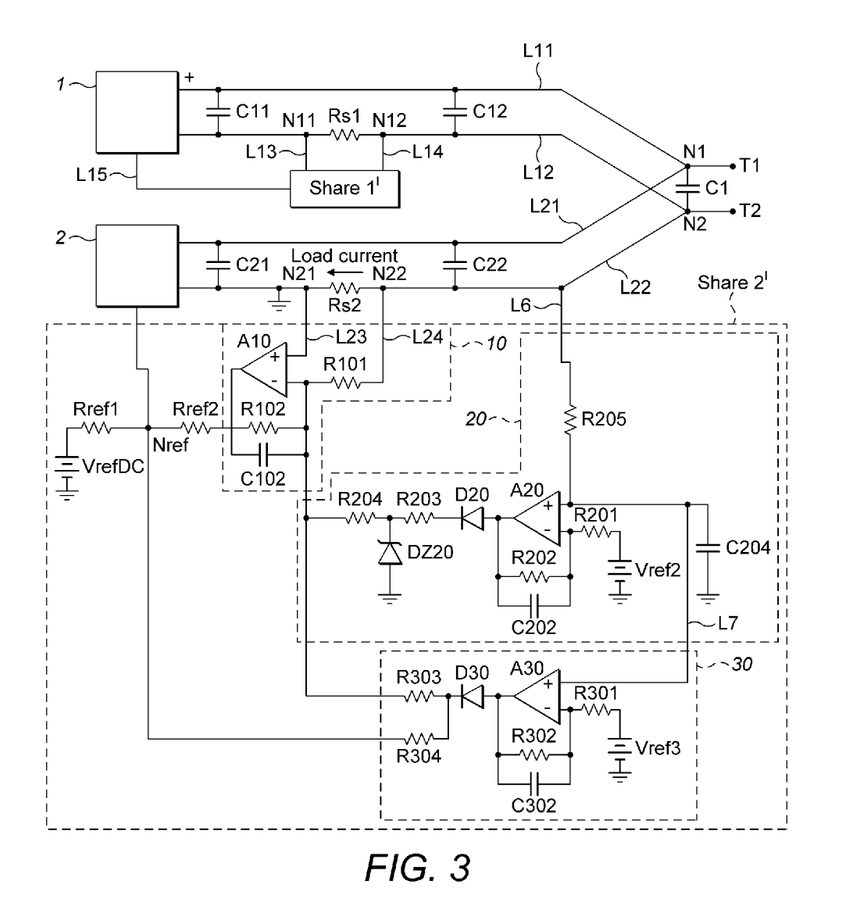
FIG. 3 shows a power supply system which incorporates an analogue load sharing module in accordance with second and third embodiments of the present invention.

FIG. 3 shows two variations of the power supply system shown in FIG. 1, in which each load sharing module Share1, Share2 comprises an additional circuit block 30, in accordance with third and fourth embodiments of the present invention.

Block 30 comprises a third operational amplifier A30. Line L7 branches from node N30 between resistor R205 and capacitor C204 in block 20, and is connected to the non-inverting input of amplifier A30. The inverting input of amplifier A30 is connected to resistor R301, which is in turn connected to voltage reference Vref3, which is in turn connected to ground. The output of amplifier A30 is connected to parallel connected resistor R302 and capacitor C202, which are in turn connected to the inverting input of amplifier A30. The output of amplifier A30 is further connected the anode of diode D30. In the first variation, the cathode of diode D30 is connected to resistor R303, which is in turn connected to the inverting input of the first amplifier A10 in block 10. In the second variation, the cathode of diode D30 is connected to resistor R304, which is in turn connected to node Nref between resistors Rref1 and Rref2. Capacitor C302 and associated resistor R302 provide low pass filtering.

When the voltage across the shunt resistor Rs1, Rs2 exceeds a third reference voltage set by Vref3, the output voltage of the amplifier A30 varies proportionally with load, at a lower rate than the second amplifier A20.

In the first variation, where the output from diode D30 is connected to the input of the first amplifier A10 via resistor R303, this provides a varying input voltage to the first amplifier A10 to increase the rate at which its output voltage varies with load.

In the second variation, where the output from diode D30 is connected node Nref via resistor R304, the output voltage of amplifier A30 reduces the effect of the output voltage of amplifier A10 at node Nref.

In both cases, the system is configured such that Vref3 substantially coincides with the second threshold load value Th2, at which the effect of the second amplifier A20 is limited.

Accordingly, in the first variation, block 30 causes the reference voltage for the power supply, and thus its output voltage, to decrease with load at a third rate which is higher than the first rate, but less than the second rate.

Whereas, in the second variation block 30 causes the reference voltage for the power supply, and thus its output voltage, to decrease with load at a third rate which is less than the first rate.

Figure 4:
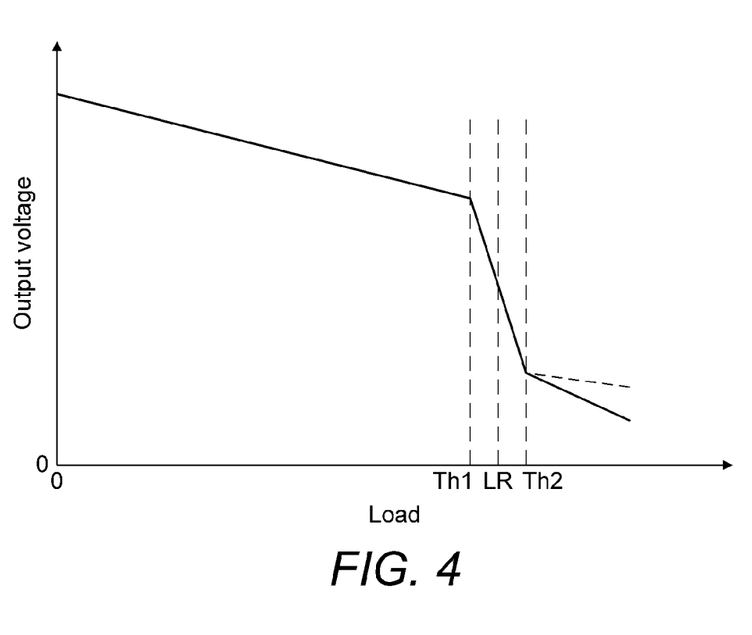
FIG. 4 illustrates the relationship between output voltage and output load for one of the power supplies in FIG. 3.

FIG. 4 illustrates the relationship between output voltage and output load for one of the power supplies 1, 2 in the power supply system of FIG. 3. The dotted line represents the first variation and the solid line represents the second variation.

Figure 5:
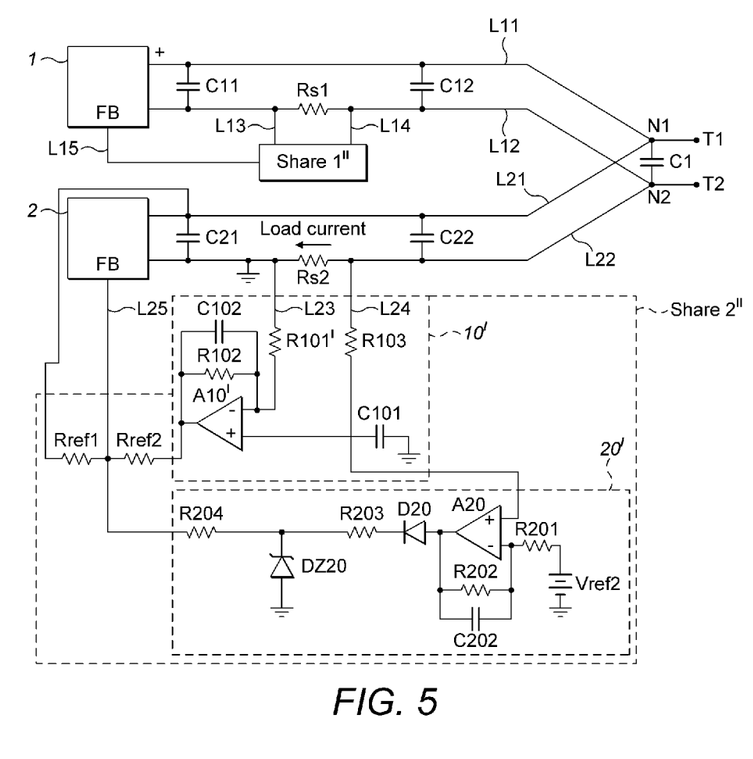
FIG. 5 shows a power supply system which incorporates an analogue load sharing module in accordance with a fourth embodiment of the present invention.

FIG. 5 shows a further variation of the power supply system illustrated in FIG. 1.

Two power supplies, 1, 2 are connected output terminals T1, T2, as described above in relation to FIG. 1. Each power supply has an associated load sharing module Share1", Share2". Only the load sharing module Share2" is illustrated in detail in FIG. 5. However, the load sharing module Share1" comprises corresponding components and circuitry. Thus, the following description applies to both Share1" and Share2".

The load sharing module Share1", Share2" comprises two circuit blocks 10', 20'.

Block 10' comprises a first operational amplifier A10', which is configured as a non-inverting amplifier. Line L23 (L13) is connected to resistor R101', which is turn connected to the inverting input of amplifier A10'. Line L24 (L14) is connected to resistor R103, which is turn connected to the non-inverting input of amplifier A10'. The non-inverting input of amplifier A10' is further connected to a capacitor C101, which is in turn connected to ground. The output of amplifier A10' is connected to parallel connected resistor R102 and capacitor C102, which are in turn connected to the inverting input of amplifier A10'.

The output of amplifier A10' is further connected to series connected resistors Rref2, Rref1, which are in turn connected to capacitor C21 (C11). Line L25' (L15'), which carries input from the load sharing module to the power supply, branches from a node FB between resistors Rref1 and Rref2 which is the feedback input to the dc:dc converter.

Block 20' is similar to block 20 in FIG. 1. However, line L6, resistor R205 and capacitor C204 are omitted. Instead, the non-inverting input of amplifier A20' is connected to resistor R103 and capacitor C101 in Block 10'. Further, resistor R204 is connected to node Nref, instead of an input terminal of the first amplifier A10'.

In the embodiment of FIG. 5, the first amplifier A10' controls the output voltage of the respective power supply by modifying the feedback signal to the respective power supply, to give a defined output impedance.

At zero load, the output voltage of both amplifiers A10', A20 is zero (assuming the use of rail-to-rail amplifiers operating off a single positive supply). The feedback signal supplied to the power supply is then the output voltage divided down by the network of Rref1, Rref2, R203 and R204.

Above zero load, the output voltage of amplifier A10' increases at a substantially constant rate with increasing load. Below a threshold value Th1, just below the load rating of the power supply, the output voltage of amplifier A20 is zero. However, above threshold value Th2, which is defined by Vref2, the output voltage of the second amplifier A20' increases at a substantially constant rate with increasing load. Zener diode DZ20, limits the effect of second amplifier A20 above a certain voltage, which corresponds to a second threshold load value Th2.

Thus, in the range 0-Th1, the effect of the first amplifier A10' causes the output voltage of the power supply to vary with load at a first substantially constant rate. In the range Th1-Th2, the additional contribution of the second amplifier A20 causes the output voltage of the power supply to vary with load at a second substantially constant rate, which is higher than the first rate. Above Th2, the second amplifier has no additional effect, and the rate at which the output voltage of the power supply varies with load reverts to the first rate.

As with the embodiment of FIG. 1, it would be possible to incorporate additional circuitry similar to block in FIG. 3, to control the rate at which the output voltage of the power supply varies with load above Th2.

Figure 6:
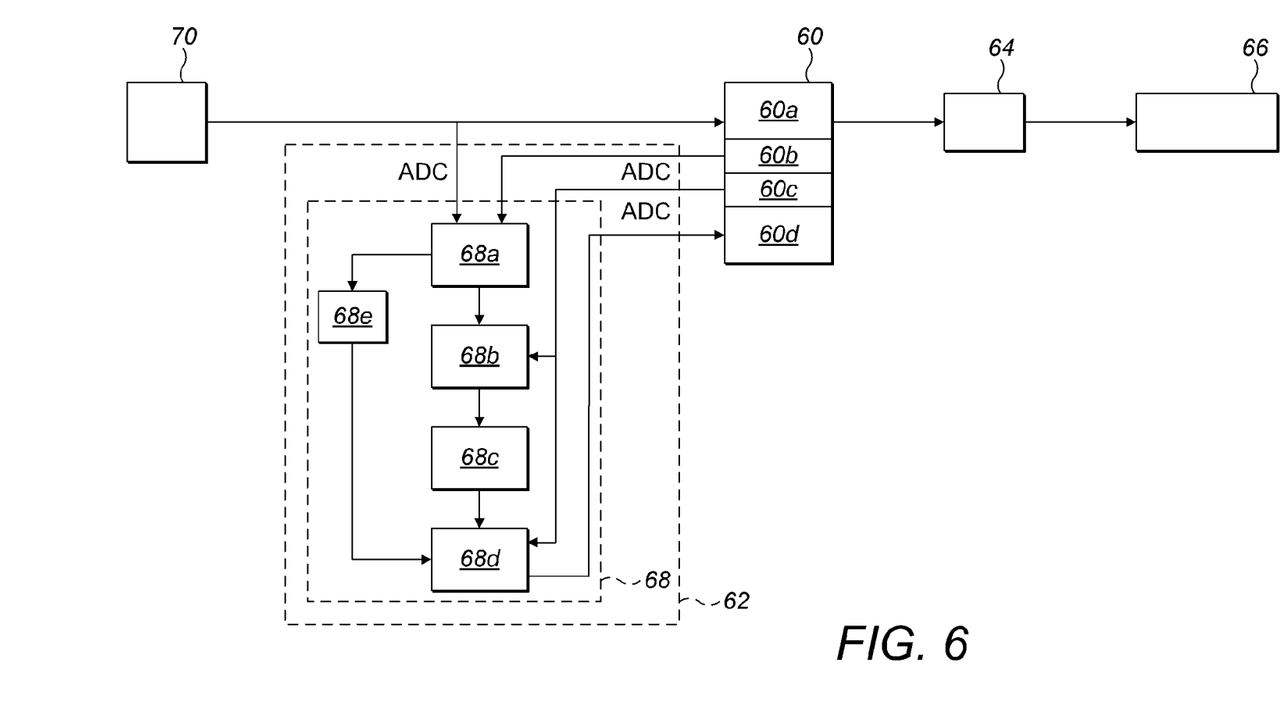
FIG. 6 shows a digitally controlled power supply system, which incorporates a load sharing module in accordance with a sixth embodiment of the present invention.

FIG. 6 shows a block diagram for a digitally controlled power supply, within a multiple power supply system, which incorporates a load sharing module in accordance with a fifth embodiment of the present invention.

The power supply comprises a DC:DC converter 60 and a microprocessor 62, which incorporates a load sharing software module 68. The power supply is connected to an ORING circuit 64, which allows one or more additional power supplies (not shown), to be connected together in parallel. The combined output voltage from all power supplies is output by the ORING circuit, and made available to external applications by a voltage output interface 66.

The converter 60 comprises a power converting module 60a for converting a DC input voltage to a DC output voltage, a current sensing module 60b for sensing the converter current, a feedback module (winding) 60c and a control input 60d for receiving a control signal from the microprocessor. The microprocessor 62 comprises a load sharing module 68. The load sharing module 68 comprises a power calculating module 68a, a droop calculating module 68b, a reference module 68c, a control module 68d and a power limiting module 68e.

In use, a supply voltage (for example, a 380V DC input voltage) is input to the converter, and converted by the power converting module 60a to provide an isolated DC output voltage. The isolated DC output voltage is input to an ORING circuit 64, to be combined with the output voltage from other power supplies in the system.

The operation of the power converting module 60a is controlled by the microprocessor 62, and in particular, the load sharing module 68. The current sensing module 60b in the converter 60 senses the converter current and generates a signal representative of the converter current. This signal is input to the power calculating module 68a of the load sharing module via an ADC input terminal. A signal representative of the converter voltage is also input to the power calculating module 68a via another ADC input terminal. The power calculating module uses these signals to calculate a load value representative of the output power (and thus the output current) of the power supply.

The load value is input to the droop calculating module 68b, together with a feedback signal from the feedback module 60c of the converter 60. The droop calculating module uses the load value and the feedback signal value to calculate an adjusted reference value to be applied to the converter, in accordance with a pre-set droop profile, as discussed in more detail below. The adjusted reference value is registered as Vref by reference voltage module 68c, and input to the voltage control module 68d. The feedback signal is also input to the voltage control module 68d.

The voltage control 68d module generates a control signal in accordance with the reference voltage Vref and the feedback signal. This signal is input to the control input 60d of the converter, to regulate the output voltage of the power supply to follow the reference voltage, by varying the operating frequency.

In addition, the output load value generated by the power calculating module 68a is input to the power limiting module 68e, which monitors the output load value. The power limiting module outputs a signal to the voltage control module, to reduce the output voltage of the power supply, if the load value exceeds a pre-determined value for longer than a pre-determined duration. This ensures the power supply does not operate in overload for too long.

The droop calculating module 68b adjusts the reference voltage Vref in accordance with the load value, such that the reference voltage varies inversely in proportion to the load value at a first rate in the range 0-Th1, where Th1 is a first threshold load value just below the load rating of the power supply. Above Th1, and below Th2, which is a second threshold load value just above the load rating of the power supply, the droop calculating module adjusts the reference voltage Vref to vary inversely in proportion to the load value at a second rate which is higher than the first rate. Above Th2, the droop calculating module adjusts the reference voltage Vref to vary inversely in proportion to the load value at the first rate, or at a third rate which is lower than the second rate, but may be higher or lower than the first rate. Thus, the droop calculating module is configured to apply one of the droop profiles illustrated in FIGS. 2 and 4.

Figure 7:
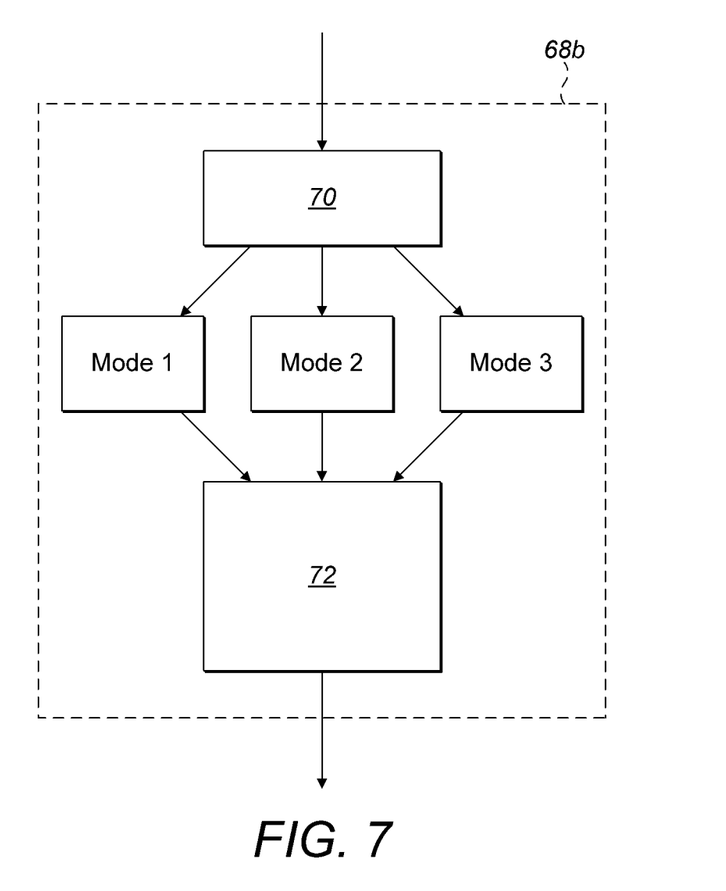
FIG. 7 illustrates an implementation of the droop calculating module of the load sharing module in FIG. 6.

FIG. 7 illustrates a possible implementation of the droop calculating module 68b. The load value calculated by the power calculating module 68a is input to a mode selecting module 70. The mode selecting module selects mode 1, 2, or 3 based on whether the load value falls into a first range 0-Th1, a second range, Th1-Th2 or a third range >Th2, respectively. In mode 1 a first droop rate is selected, in mode 2 a second droop rate is selected, and in mode 3 a third droop rate is selected. The selected rate The result of this determination is then input to a result calculating module 72, which calculates the reference voltage according to the formula:

Voltage reference=−(selected rate)×load value+constant

Figure 8:
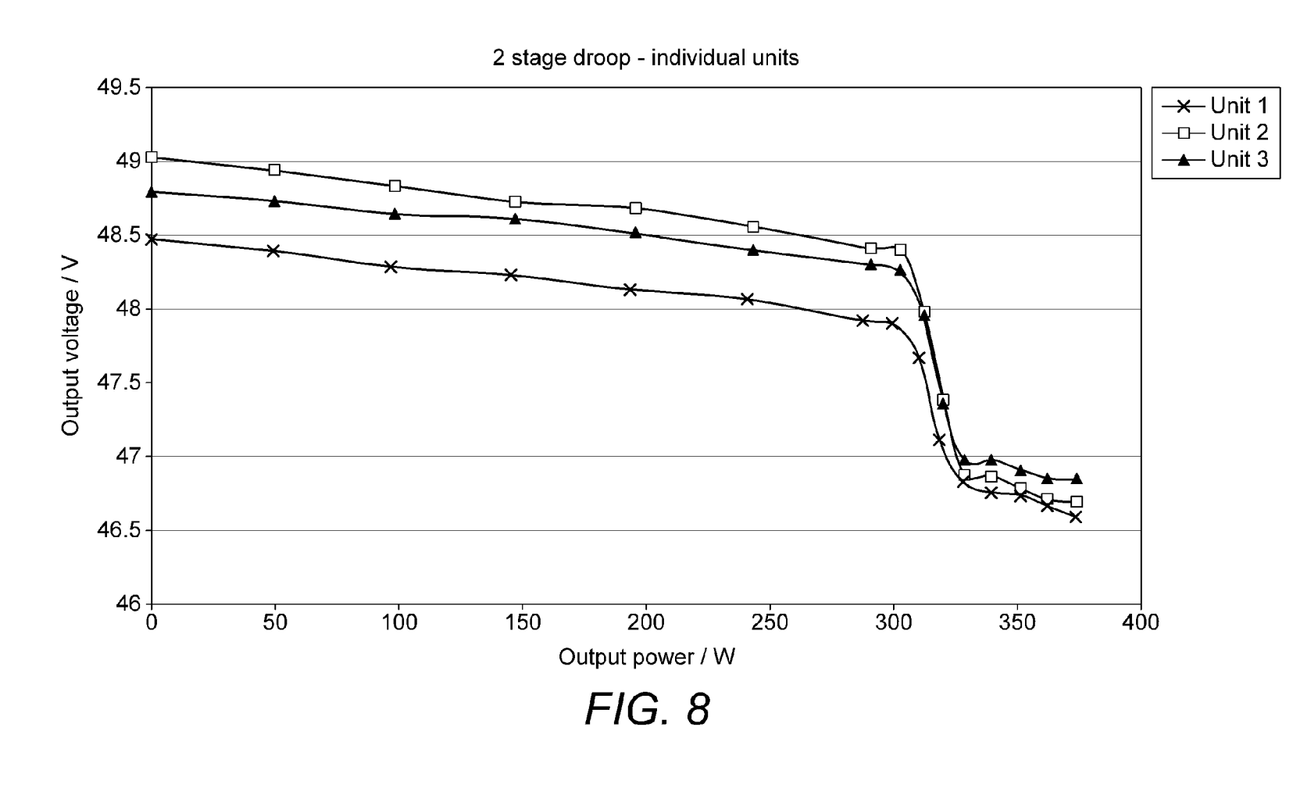
FIG. 8 illustrates output voltage plotted against output power for three power supplies rated at 300 W.

FIG. 8 shows a graph of output voltage against output power for three power supplies rated at 300 W, and each incorporating a load sharing module which embodies the present invention. For the purposes of illustration, the output voltages are intentionally set to be different, to represent the worst case situation. The three droop stages are clearly apparent.

Figure 9:
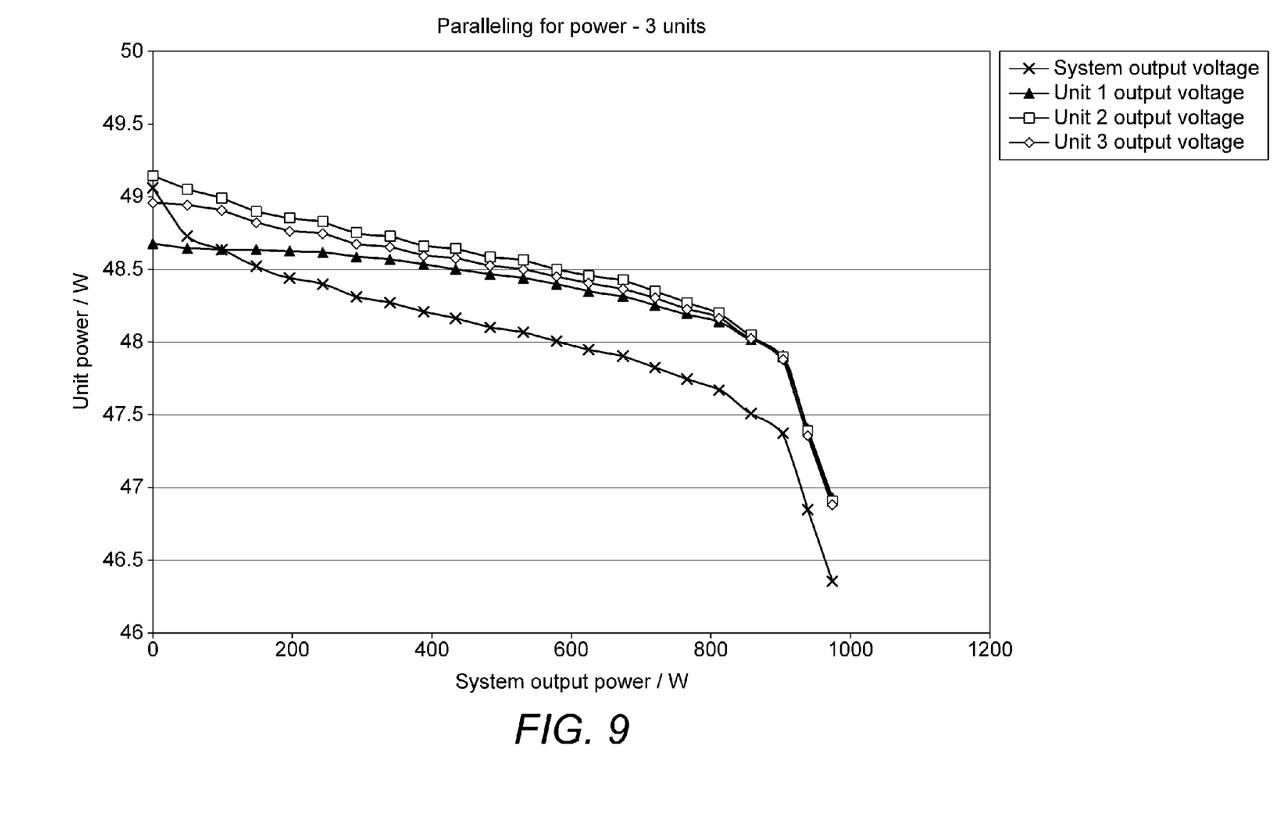
FIG. 9 illustrates output voltage plotted against system output power for three power supplies, and for the system overall, when the power supplies are connected together in parallel.

FIG. 9 shows a graph of output voltage against system output power for each power supply, and for the system overall, when the power supplies are connected together in parallel.

Figure 10:
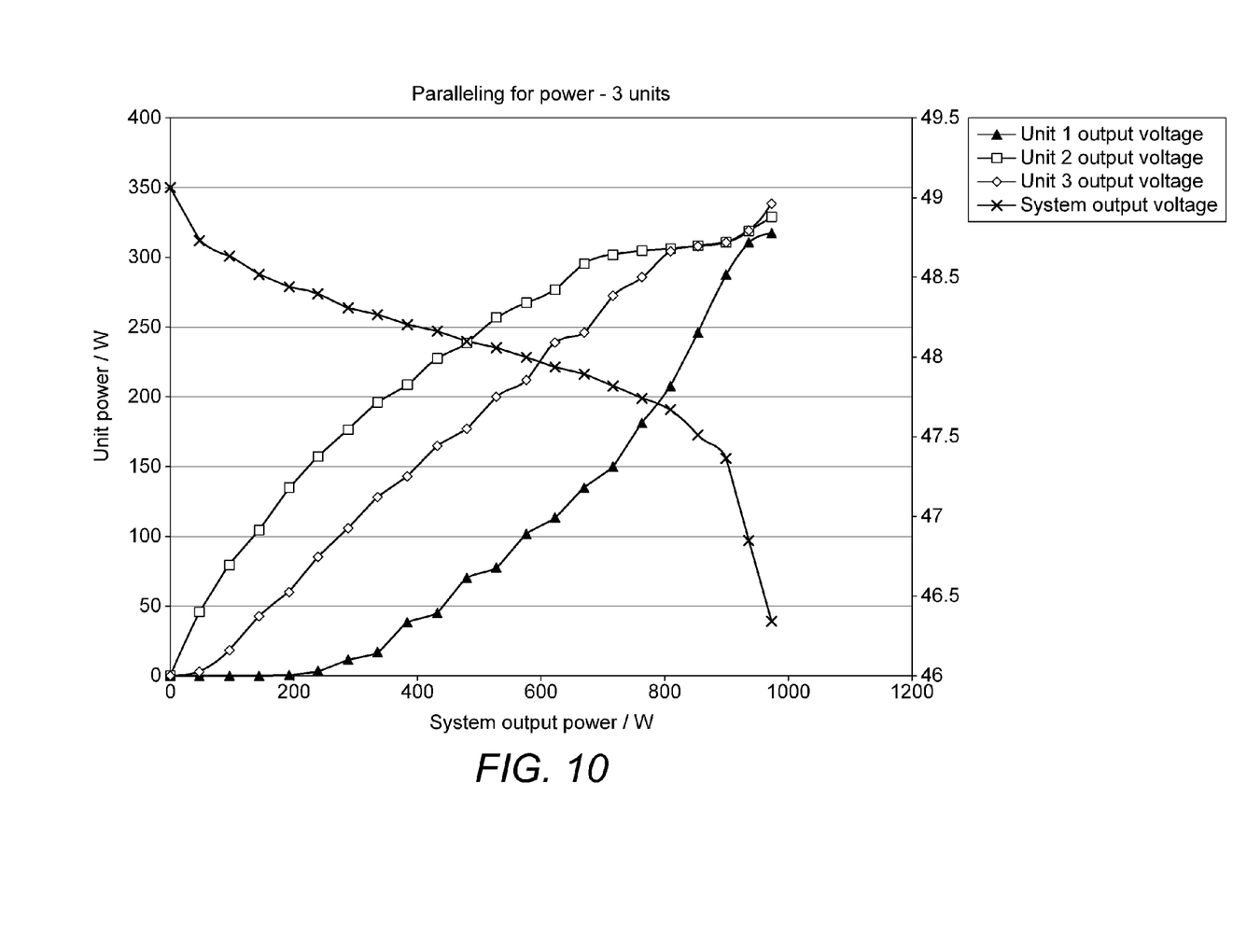
FIG. 10 illustrates power supply output power plotted against the overall system output voltage when the three power supplies are connected in parallel.

FIG. 10 shows a graph of power supply output power against the overall system output voltage when the three power supplies are connected in parallel.

As can be seen, there is some load sharing at lighter loads, but more accurate sharing at higher loads, corresponding to the region Th1-Th2 for one or more of the power supplies.

The present invention has been described in terms of DC:DC power supplies. It will be appreciate that the invention may also apply to any power supplies with a DC output. E.g., AC:DC power supplies.

The circuits illustrated herein are representative circuits. It will be appreciated that other implementations that perform the functions of the present invention are possible.

The invention claimed is:

1. Load sharing apparatus for load sharing between a plurality of power supplies, the apparatus comprising a plurality of load sharing modules, each for association with a respective power supply, each load sharing module comprising:
   a load determining module to generate a signal which represents a load value corresponding to the power or current supplied by the respective power supply; and
   a voltage control module to control an output voltage of the respective power supply to vary inversely with said load value at a first rate when the load value is below a first threshold value based on a maximum load rating of the respective power supply, and to control the output voltage of the respective power supply to vary inversely with said load value at a second rate when the load value equals or exceeds said first threshold value based on the maximum load rating of the respective power supply;
   wherein said second rate is greater than said first rate.

2. Load sharing apparatus as claimed in claim 1 wherein said first threshold value is between 95% and 100% of the maximum load rating of the power supply.

3. Load sharing apparatus as claimed in claim 1 wherein the voltage control module is configured for controlling the output voltage of the respective power supply to vary inversely with said load value at a third rate, which is lower than the second rate, when the load value equals or exceeds a second threshold value which is higher than the first threshold value.

4. Load sharing apparatus as claimed in claim 3 wherein the third rate is substantially equal to the first rate.

5. Load sharing apparatus as claimed in claim 3 wherein the third rate is higher than the first rate.

6. Load sharing apparatus as claimed in claim 3 wherein the third rate is lower than the first rate.

7. Load sharing apparatus as claimed in claim 3 wherein the second threshold load value is between 100% and 105% of the maximum load rating of the power supply.

8. Load sharing apparatus as claimed claim 3 further comprising a load limiting module to monitor load value, and to reduce the output voltage of the respective power supply when the load exceeds a third threshold value for a predetermined duration.

9. Load sharing apparatus as claimed in claim 8 wherein the third threshold value is between 120% and 140% of the maximum load rating of the power supply.

10. Load sharing apparatus as claimed in claim 1 wherein the load sharing module comprises a limiting module to limit the total voltage reduction at said second rate, such that the output voltage of the respective power supply varies at the second rate between the first threshold value and a second threshold value.

11. Load sharing apparatus for load sharing between a plurality of power supplies, the apparatus comprising one or more load sharing modules, each for association with a respective power supply, each load sharing module comprising:
   a load determining module to generate a signal which represents a load value corresponding to the power or current supplied by the respective power supply;
   a mode selecting module to select a first mode of operation when said load value is below a first threshold value based on a maximum load rating of the respective power supply and a second mode of operation when said load value equals or exceeds said first threshold value based on the maximum load rating of the respective power supply; and a voltage control module to control the output voltage of the respective power supply to vary inversely with said load value at a first rate when the first mode is selected, and to control the output voltage of the respective power supply to vary inversely with said load value at a second rate when the second mode is selected;

wherein said second rate is greater than said first rate.

12. Load sharing apparatus as claimed in claim 11 wherein the mode selecting module is configured to select a third mode of operation when said load value equals or exceeds a second threshold value which is higher than the first threshold value.

13. Load sharing apparatus as claimed in claim 12 wherein the voltage control module is configured to control the output voltage of the respective power supply to vary inversely with said load value at a third rate, lower than the second rate, when the third mode is selected.

14. Load sharing apparatus as claimed in claim 13 wherein the third rate is substantially equal to the first rate.

15. Load sharing apparatus as claimed in claim 13 wherein the third rate is higher than the first rate.

16. Load sharing apparatus as claimed in claim 13 wherein the third rate is lower than the first rate.

17. Load sharing apparatus as claimed in claim 11 wherein the load sharing module comprises a limiting module for limiting the total voltage reduction at said second rate, such that the output voltage of the respective power supply varies at the second rate between the first threshold value and a second threshold value.

\* \* \* \* \*